United States Patent
Imamura et al.

(10) Patent No.: US 11,066,722 B2
(45) Date of Patent: Jul. 20, 2021

(54) METHOD OF PRODUCING GRAIN-ORIENTED ELECTRICAL STEEL SHEET

(71) Applicant: JFE STEEL CORPORATION, Tokyo (JP)

(72) Inventors: Takeshi Imamura, Tokyo (JP); Minoru Takashima, Tokyo (JP); Yuiko Ehashi, Tokyo (JP); Yasuyuki Hayakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 175 days.

(21) Appl. No.: 16/079,669

(22) PCT Filed: Mar. 7, 2017

(86) PCT No.: PCT/JP2017/009079
§ 371 (c)(1),
(2) Date: Aug. 24, 2018

(87) PCT Pub. No.: WO2017/154929
PCT Pub. Date: Sep. 14, 2017

(65) Prior Publication Data
US 2019/0055619 A1 Feb. 21, 2019

(30) Foreign Application Priority Data
Mar. 9, 2016 (JP) .............................. JP2016-046026

(51) Int. Cl.
*C21D 9/46* (2006.01)
*C22C 38/60* (2006.01)
(Continued)

(52) U.S. Cl.
CPC ............... *C21D 9/46* (2013.01); *C21D 6/001* (2013.01); *C21D 6/002* (2013.01); *C21D 6/005* (2013.01);
(Continued)

(58) Field of Classification Search
CPC .................................. C21D 9/46; C22C 38/60
(Continued)

(56) References Cited

U.S. PATENT DOCUMENTS 3,333,992 A 8/1967 Kohler
3,932,234 A 1/1976 Imanaka et al.
(Continued)

FOREIGN PATENT DOCUMENTS

CN 101684514 A 3/2010
CN 104674136 A 6/2015
(Continued)

OTHER PUBLICATIONS

May 5, 2019, Office Action issued by the China National Intellectual Property Administration in the corresponding Chinese Patent Application No. 201780013668.1 with English language search report.
(Continued)

*Primary Examiner* — Weiping Zhu
(74) *Attorney, Agent, or Firm* — Kenja IP Law PC

(57) ABSTRACT

To provide a grain-oriented electrical steel sheet that has better magnetic property than conventional ones, in hot band annealing of the hot rolled steel sheet obtained by a predetermined step, an average heating rate from ordinary temperature to 400° C. is set to 50° C./s or more, and a time to reach 900° C. from 400° C. is set to 100 sec or less.

4 Claims, 1 Drawing Sheet

(51) Int. Cl.
| | |
|---|---|
| C21D 6/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/34 | (2006.01) |
| H01F 1/16 | (2006.01) |
| H01F 1/147 | (2006.01) |
| C22C 38/08 | (2006.01) |
| C22C 38/16 | (2006.01) |
| C22C 38/14 | (2006.01) |
| C22C 38/12 | (2006.01) |
| C21D 8/02 | (2006.01) |

(52) U.S. Cl.
CPC ........... *C21D 6/008* (2013.01); *C21D 8/0205* (2013.01); *C21D 8/1222* (2013.01); *C21D 8/1233* (2013.01); *C21D 8/1261* (2013.01); *C21D 8/1272* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/34* (2013.01); *C22C 38/60* (2013.01); *H01F 1/14783* (2013.01); *H01F 1/16* (2013.01); *C21D 2201/05* (2013.01); *C22C 2202/02* (2013.01); *Y02P 10/20* (2015.11)

(58) Field of Classification Search
USPC .......................................................... 148/111
See application file for complete search history.

(56) References Cited

U.S. PATENT DOCUMENTS

| | | | |
|---|---|---|---|
| 4,255,205 A | 3/1981 | Morito et al. | |
| 4,468,551 A | 8/1984 | Neiheisel | |
| 4,919,733 A | 4/1990 | Salsgiver et al. | |
| 4,979,997 A | 12/1990 | Kobayashi et al. | |
| 5,082,509 A | 1/1992 | Ushigami et al. | |
| 5,141,573 A | 8/1992 | Nakashima | |
| 5,643,370 A | 7/1997 | Huppi | |
| 8,784,995 B2 * | 7/2014 | Omura | C21D 8/12 428/471 |
| 9,187,798 B2 * | 11/2015 | Takenaka | C21D 8/12 |
| 9,708,682 B2 * | 7/2017 | Hayakawa | C23C 8/26 |
| 2002/0033206 A1 | 3/2002 | Cicale et al. | |
| 2002/0157734 A1 | 10/2002 | Senda et al. | |
| 2003/0116236 A1 | 6/2003 | Hayakawa et al. | |
| 2009/0165895 A1 | 7/2009 | Ushigami et al. | |
| 2012/0302424 A1 | 11/2012 | Kobayashi et al. | |
| 2014/0202599 A1 | 7/2014 | Watanabe et al. | |
| 2019/0055619 A1 | 2/2019 | Imamura et al. | |
| 2019/0323100 A1 | 10/2019 | Imamura et al. | |

FOREIGN PATENT DOCUMENTS

| | | | |
|---|---|---|---|
| JP | S8008214 B | | 6/1963 |
| JP | S4015644 B | | 7/1965 |
| JP | S5113469 B2 | | 4/1976 |
| JP | S5224116 A | | 2/1977 |
| JP | 2782086 B2 | | 7/1998 |
| JP | 2000129356 A | | 5/2000 |
| JP | 2002241906 A | | 8/2002 |
| JP | 2008031498 A | | 2/2008 |
| JP | 2010100885 A | | 5/2010 |
| JP | 2011219793 A | | 11/2011 |
| JP | 2015200002 A | * | 11/2015 |
| JP | 2015200002 A | | 11/2015 |

OTHER PUBLICATIONS

Joachim Kunze et al., Solubility of nitrogen in Fe—Si alloys, Journal of Materials Science Letters, Aug. 1986, pp. 815-818, vol. 5, No. 8.

May 23, 2017, International Search Report issued in the International Patent Application No. PCT/JP2017/009079.

T. Ros-Yáñez et al., Production of high silicon steel for electrical applications by thermomechanical processing, Journal of Materials Processing Technology, 2003, pp. 132-137, vol. 141.

* cited by examiner

METHOD OF PRODUCING GRAIN-ORIENTED ELECTRICAL STEEL SHEET

TECHNICAL FIELD

The present disclosure relates to a method of producing a grain-oriented electrical steel sheet suitable for an iron core material of a transformer.

BACKGROUND

A grain-oriented electrical steel sheet is a soft magnetic material mainly used as an iron core material of an electrical device such as a transformer or a generator, and has crystal texture in which the <001> orientation which is the easy magnetization axis of iron is highly aligned with the rolling direction of the steel sheet. Such texture is formed through secondary recrystallization of preferentially causing the growth of giant crystal grains in the (110)[001] orientation which is called Goss orientation, when secondary recrystallization annealing is performed in the process of producing the grain-oriented electrical steel sheet.

A typical technique used for such a grain-oriented electrical steel sheet causes grains having Goss orientation to undergo secondary recrystallization during final annealing using a precipitate called an inhibitor. For example, JP S40-15644 B2 (PTL 1) discloses a method using AlN and MnS, and JP S51-13469 B2 (PTL 2) discloses a method using MnS and MnSe. These methods are in actual use industrially. These methods using inhibitors require slab heating at high temperature exceeding 1300° C. for complete dissolution of inhibitor components, but are very useful in stably developing secondary recrystallization grains. To strengthen the function of such inhibitors, JP S38-8214 B2 (PTL 3) discloses a method using Pb, Sb, Nb, and Te, and JP S52-24116 A (PTL 4) discloses a method using Zr, Ti, B, Nb, Ta, V, Cr, and Mo.

Moreover, JP 2782086 B2 (PTL 5) proposes a method whereby the content of acid-soluble Al (sol.Al) is 0.010% to 0.060%, slab heating is controlled to low temperature, and nitriding is performed in an appropriate nitriding atmosphere in decarburization annealing, as a result of which (Al, Si)N is precipitated and used as an inhibitor in secondary recrystallization. Many such methods of performing nitriding treatment at an intermediate point in the production process and using (Al,Si)N or AlN as an inhibitor are proposed as nitriding methods.

JP 2000-129356 A (PTL 6) discloses a technique of preferentially causing secondary recrystallization of Goss-oriented crystal grains using a raw material not containing an inhibitor component. This technique eliminates impurities such as an inhibitor component as much as possible and elicits the dependency of grain boundary energy of crystal grain boundaries in primary recrystallization on the grain boundary orientation difference angle, thus causing secondary recrystallization of Goss-oriented grains without using an inhibitor. This effect is called a texture inhibition effect. This method does not require fine particle distribution of an inhibitor into steel, and so does not need to perform high-temperature slab heating which has been essential. Thus, the method is highly advantageous in terms of both cost and maintenance.

CITATION LIST

Patent Literatures

PTL 1: JP S40-15644 B2
PTL 2: JP S51-13469 B2
PTL 3: JP S38-8214 B2
PTL 4: JP S52-24116 A
PTL 5: JP 2782086 B2
PTL 6: JP 2000-129356 A

Non-Patent Literatures

NPL 1: Joachim Kunze et al. "Solubility of nitrogen in Fe—Si alloys", Journal of Materials Science Letters 5 (1986) p. 815-818

SUMMARY

Technical Problem

However, since a raw material not containing an inhibitor component has no inhibitor that has a function of inhibiting grain growth during primary recrystallization annealing to achieve uniform grain size and further enhancing the sharpness of Goss orientation during secondary recrystallization, the final magnetic property has been found to be inferior to that of a method using an inhibitor in many cases.

It could therefore be helpful to provide a grain-oriented electrical steel sheet having better magnetic property than conventional ones even with a chemical composition not actively using an inhibitor, by increasing the average heating rate in hot band annealing as high as possible to suppress coarsening of silicon nitride in precipitates in steel formed in a heating initial stage and thereafter appropriately adjusting the dispersion state of a trace amount of AlN precipitate generated with the silicon nitride as nuclei.

Solution to Problem

The following describes the experimental results that led to the present disclosure.

Experiment 1

A steel slab containing, in mass ratio, C: 0.060%, Si: 3.15%, Mn: 0.12%, N: 41 ppm, sol.Al: 72 ppm, S: 36 ppm, and Se: 30 ppm was produced by continuous casting, subjected to slab heating involving soaking at 1200° C. for 60 min, and then hot rolled to a thickness of 2.3 mm. The hot rolled sheet was then subjected to hot band annealing at 1000° C. for 30 sec in a dry nitrogen atmosphere. In the heating process in the hot band annealing, the heating rate from ordinary temperature to 400° C. was varied, and the subsequent time to reach 900° C. from 400° C. was set to 50 sec. Pickling was performed after the hot band annealing to remove scale from the hot rolled sheet surface, and then the hot rolled sheet was cold rolled to a sheet thickness of 0.23 mm.

The cold rolled sheet was further subjected to primary recrystallization annealing also serving as decarburization at 830° C. for 150 sec in a wet atmosphere of 50% $H_2$-50% $N_2$ with a dew point of 50° C. Subsequently, an annealing separator mainly composed of MgO was applied, and secondary recrystallization annealing involving holding the steel sheet at 1200° C. for 5 hr in a hydrogen atmosphere was performed. The magnetic flux density $B_8$ (magnetic flux density when excited with a magnetizing force of 800 A/m) of the obtained sample was measured by the method prescribed in JIS C2550. FIG. 1 illustrates the results of arranging the measured magnetic flux density $B_8$ according to the average heating rate from ordinary temperature to 400° C. in the hot band annealing. The results demonstrate that a higher average heating rate to 400° C. contributes to better magnetic property.

Experiment 2

A steel slab containing, in mass ratio, C: 0.043%, Si: 3.36%, Mn: 0.07%, N: 29 ppm, sol.Al: 80 ppm, and S: 20 ppm was produced by continuous casting, subjected to slab heating involving soaking at 1220° C. for 45 min, and then hot rolled to a thickness of 2.0 mm. The hot rolled sheet was then subjected to hot band annealing at 1050° C. for 30 sec in a dry nitrogen atmosphere. In the heating process in the hot band annealing, the average heating rate from ordinary temperature to 400° C. was set to 75° C./s, and the time to reach 900° C. from 400° C. was varied. Pickling was performed after the hot band annealing to remove scale from the surface, and then the hot rolled sheet was cold rolled to a sheet thickness of 0.23 mm.

The cold rolled sheet was further subjected to primary recrystallization annealing also serving as decarburization at 840° C. for 120 sec in a wet atmosphere of 60% $H_2$-40% $N_2$ with a dew point of 60° C. Subsequently, an annealing separator mainly composed of MgO was applied, and secondary recrystallization annealing involving holding the steel sheet at 1200° C. for 10 hr in a hydrogen atmosphere was performed. The magnetic flux density $B_8$ (magnetic flux density when excited with 800 A/m) of the obtained sample was measured by the method prescribed in JIS C2550. FIG. 2 illustrates the results of arranging the measured magnetic flux density $B_8$ according to the time to reach 900° C. from 400° C. in the hot band annealing. The results demonstrate that a shorter time to reach 900° C. from 400° C. contributes to better magnetic property.

These two experimental results can be summarized as follows: in the heating process in the hot band annealing, heating from 400° C. to 900° C. in a short time contributes to excellent magnetic property, and rapid heating from ordinary temperature to 400° C. contributes to excellent magnetic property. Although the reason for this is not exactly clear, we consider the reason as follows.

In an inhibitorless raw material, the Al content is low and the Si content is high in the steel. Accordingly, in the heating process in the hot band annealing, silicon nitride mainly having a composition of $Si_3N_4$ forms in the steel as a precipitate. Joachim Kunze et al. "Solubility of nitrogen in Fe—Si alloys", Journal of Materials Science Letters 5 (1986) p. 815-818 (NPL 1) discloses the solubility product of $Si_3N_4$ which precipitates in steel of a phase.

Calculating the melting temperature of $Si_3N_4$ from the chemical composition in the foregoing Experiment 1 based on the solubility product described in NPL 1 yields about 910° C. This suggests that a precipitate of $Si_3N_4$ is present up to about 910° C. (which may vary to some extent depending on components) in the heating process in the hot band annealing.

It is known that, due to heat treatment, small precipitates in steel disappear and large precipitates in steel become larger (Ostwald ripening). In other words, due to heat treatment, the precipitate distribution becomes sparse and the precipitate size coarsens. Hence, for $Si_3N_4$, changes in precipitate distribution or size of $Si_3N_4$ can be prevented by shortening the heating time from 400° C. to 900° C. This results in $Si_3N_4$ precipitate being present with a dense distribution while maintaining small precipitate size. $Si_3N_4$ is known to change to AlN precipitate as a result of Si being substituted by Al during soaking in hot band annealing. This suggests that, by shortening the heating time from 400° C. to 900° C., the distribution of AlN after the hot band annealing can be made dense and the precipitate size can be reduced.

Although the reason that the magnetic flux density is improved by significantly increasing the average heating rate from ordinary temperature to 400° C. is not exactly clear, we consider the reason as follows. In a temperature range from ordinary temperature to about 400° C., Si hardly diffuses in the steel, whereas N tends to diffuse over a considerable distance because it is a light element. Therefore, if the average heating rate is significantly increased, the diffusion distance of N is reduced, which enables fine and dense distribution of $Si_3N_4$ precipitate. Thus, by finely and densely distributing $Si_3N_4$ precipitate in the initial stage by rapid heating and also shortening the subsequent heating time, it is possible to suppress coarsening and sparse distribution of $Si_3N_4$. Consequently, the distribution of AlN resulting from the above-mentioned substitution during the soaking is made dense and the precipitate size is reduced, which enhances the sharpness of Goss orientation after the secondary recrystallization and improves the magnetic property (magnetic flux density $B_8$) of the final product.

Since AlN is more stable than $Si_3N_4$, once AlN forms, the above-mentioned control is expected to be difficult. Even in the case where the process includes cold rolling twice or more with intermediate annealing performed therebetween, $Si_3N_4$ precipitate forms only in the heating process in the hot band annealing. It is therefore essential to perform the above-mentioned control in the hot band annealing, and not in the intermediate annealing.

The mechanism described above is assumed to be not applicable to chemical compositions not containing Al and N. It is, however, impossible to produce a steel sheet using a chemical composition not containing Al and N at all, in industrial-scale production. Hence, the above-mentioned control is very important.

The present disclosure is based on these experimental results. We thus provide the following.

1. A method of producing a grain-oriented electrical steel sheet, comprising: heating a steel slab at 1300° C. or less, the steel slab having a chemical composition containing (consisting of) C: 0.002 mass % or more and 0.100 mass % or less, Si: 2.00 mass % or more and 6.50 mass % or less, Mn: 0.02 mass % or more and 1.00 mass % or less, S: 50 mass ppm or less, N: 50 mass ppm or less, Se: 50 mass ppm or less, acid-soluble Al: less than 100 mass ppm, and a balance being Fe and inevitable impurities; subjecting the steel slab to hot rolling, to obtain a hot rolled steel sheet; subjecting the hot rolled steel sheet to hot band annealing; subjecting the hot rolled steel sheet after the hot band annealing to cold rolling once, or twice or more with intermediate annealing performed therebetween, to obtain a cold rolled steel sheet having a final sheet thickness; subjecting the cold rolled steel sheet to primary recrystallization annealing; and applying an annealing separator to a surface of the cold rolled steel sheet after the primary recrystallization annealing, and thereafter subjecting the cold rolled steel sheet to secondary recrystallization annealing, wherein in the hot band annealing, an average heating rate from ordinary temperature to 400° C. is set to 50° C./s or more, and a time to reach 900° C. from 400° C. is set to 100 sec or less.

2. The method of producing a grain-oriented electrical steel sheet according to 1, wherein the chemical composition further contains one or more selected from Sb: 0.01 mass % or more and 0.50 mass % or less, Sn: 0.01 mass % or more and 0.50 mass % or less, Ni: 0.005 mass % or more and 1.5 mass % or less, Cu: 0.005 mass % or more and 1.5 mass % or less, Cr: 0.005 mass % or more and 0.1 mass % or less, P: 0.005 mass % or more and 0.5 mass % or less, Mo: 0.005 mass % or more and 0.5 mass % or less, Ti: 0.0005 mass % or more and 0.1 mass % or less, Nb: 0.0005 mass % or more and 0.1 mass % or less, and Bi: 0.005 mass % or more and 0.1 mass % or less.

Advantageous Effect

It is thus possible to provide a grain-oriented electrical steel sheet having excellent magnetic property using an inhibitorless raw material, by increasing the average heating rate and shortening the time to reach 900° C. in the heating process in the hot band annealing.

DETAILED DESCRIPTION

Figure 1:
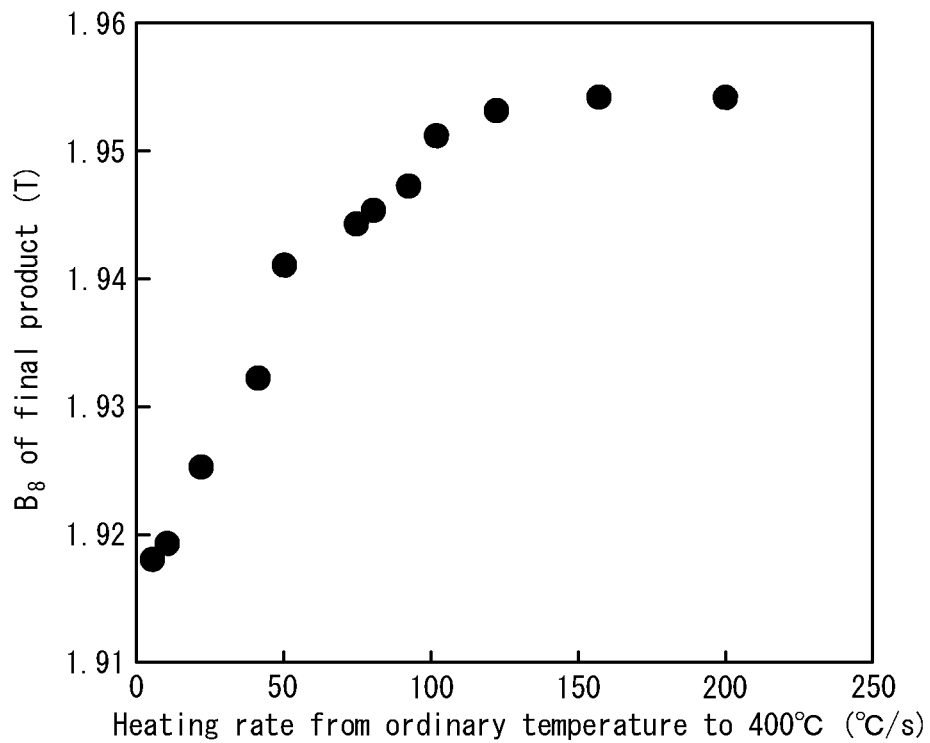
FIG. 1 is a graph illustrating the relationship between the magnetic flux density $B_8$ of a final product and the average heating rate from ordinary temperature to 400° C. in hot band annealing.
Figure 2:
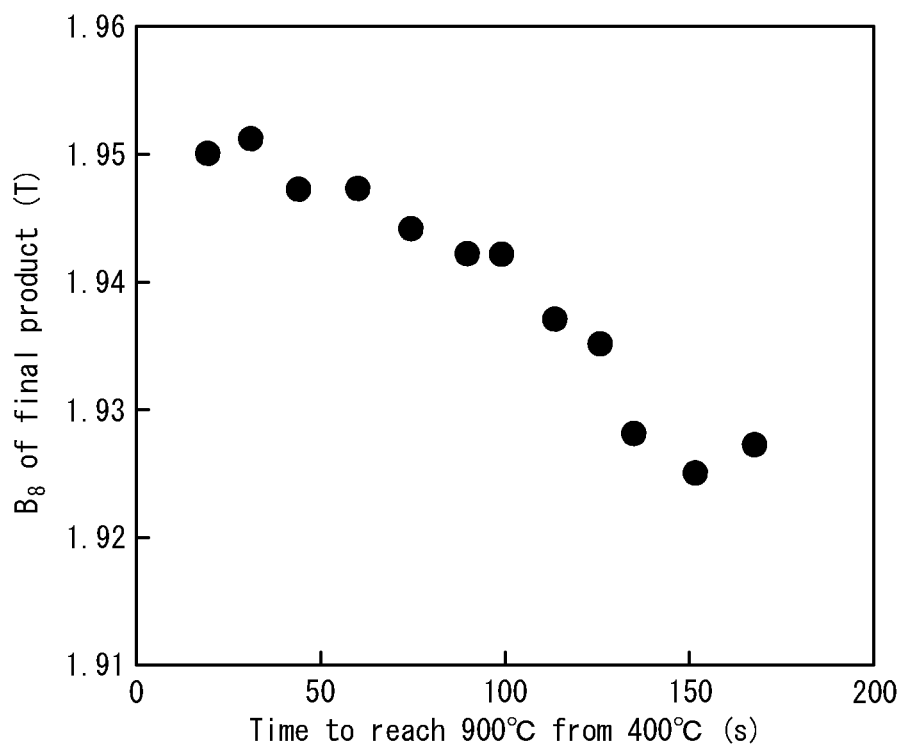
FIG. 2 is a graph illustrating the relationship between the magnetic flux density $B_8$ of a final product and the time to reach 900° C. from 400° C. in a heating process in hot band annealing.

A method of producing a grain-oriented electrical steel sheet according to one of the disclosed embodiments is described below. The reasons for limiting the chemical composition of steel are described first. In the description, "%" representing the content (amount) of each component element denotes "mass %" unless otherwise noted, and "ppm" representing the content (amount) of each component element denotes "mass ppm" unless otherwise noted.

C: 0.002% or more and 0.100% or less

If the C content is more than 0.100%, it is difficult to reduce, by decarburization annealing, the C content to 0.005% or less that causes no magnetic aging. If the C content is less than 0.002%, hot embrittlement becomes noticeable, and troubles occur frequently in slab casting or hot rolling. The C content is preferably in a range of 0.020% or more and 0.100% or less.

Si: 2.00% or more and 6.50% or less

Si is an element necessary to increase the specific resistance of the steel and reduce iron loss. This effect is insufficient if the Si content is less than 2.00%. If the Si content is more than 6.50%, workability decreases and production by rolling is difficult. The Si content is therefore in a range of 2.00% or more and 6.50% or less. The Si content is preferably in a range of 2.50% or more and 4.00% or less.

Mn: 0.02% or more and 1.00% or less

Mn is an element necessary to improve the hot workability of the steel. This effect is insufficient if the Mn content is less than 0.02%. If the Mn content is more than 1.00%, the magnetic flux density of the product sheet decreases. The Mn content is therefore in a range of 0.02% or more and 1.00% or less. The Mn content is preferably in a range of 0.04% or more and 0.30% or less.

Elements Al, S, N, and Se that can form inhibitors are desirably excluded as much as possible. It is, however, impossible to completely remove these elements in industrial-scale production, and so an allowable content of each of S, N, and Se is more than 0 ppm and 50 ppm or less, and an allowable content of sol.Al is more than 0 ppm and less than 100 ppm. Thus, in the case where reducing these elements requires tremendous cost, these elements are allowed to remain in the steel in the respective ranges. The content of each of S, N, and Se is preferably more than 0 ppm and 25 ppm or less, and the content of sol.Al is preferably more than 0 ppm and 80 ppm or less.

The basic components according to the present disclosure have been described above. The balance other than the components described above is Fe and inevitable impurities. Additionally, to improve the magnetic flux density, one or more selected from Sb: 0.01% or more and 0.50% or less, Sn: 0.01% or more and 0.50% or less, Ni: 0.005% or more and 1.5% or less, Cu: 0.005% or more and 1.5% or less, Cr: 0.005% or more and 0.1% or less, P: 0.005% or more and 0.5% or less, Mo: 0.005% or more and 0.5% or less, Ti: 0.0005% or more and 0.1% or less, Nb: 0.0005% or more and 0.1% or less, and Bi: 0.005% or more and 0.1% or less may be optionally added as appropriate. If the additive amount of each of the elements is less than the lower limit, the magnetic flux density improving effect is insufficient. If the additive amount of each of the elements is more than the upper limit, a secondary recrystallization failure ensues, and the magnetic property degrades.

The production conditions for a grain-oriented electrical steel sheet according to the present disclosure are described below.

As the slab production method, a typical production method may be used. For example, molten steel adjusted to a predetermined composition is subjected to ingot casting or continuous casting, to produce a slab. The optional additional components mentioned above are desirably added in the molten steel stage, because it is difficult to add these components at an intermediate point in the production process.

[Heating]

The slab is then heated by a typical method. Since Al and N are reduced in the chemical composition according to the present disclosure, heat treatment at high temperature to dissolve these elements is unnecessary. Accordingly, heat treatment is performed at a low temperature of 1300° C. or less, with it being possible to reduce cost.

[Hot Rolling]

After the heating, hot rolling is performed. The hot rolling is preferably performed with a start temperature of 1000° C. or more and a finish temperature of 750° C. or more, in terms of obtaining a favorable rolling shape. The finish temperature is preferably 900° C. or less, to prevent an increase of scale formed on the surface after the rolling.

[Hot Band Annealing]

Following this, hot band annealing is performed. It is essential to set, in the heating process, the average heating rate from ordinary temperature to 400° C. to 50° C./s or more and set the time to reach 900° C. from 400° C. to 100 sec or less, for the reasons stated above. Given that a magnetic flux density $B_8$ of more than 1.945 T was obtained in the experimental results described above, the average heating rate from ordinary temperature to 400° C. is preferably 100° C./s or more, and the time to reach 900° C. from 400° C. is preferably 60 sec or less.

To suppress shape degradation of the steel sheet, the average heating rate from ordinary temperature to 400° C. is preferably 500° C./s or less. To ensure sufficient $Si_3N_4$, the time to reach 900° C. from 400° C. is preferably 10 sec or more. Although the heating method is not limited, to realize an average heating rate of 50° C./s or more, not only a heating method using a conventional heater or burner but also an induction heating method or an electric resistance heating method may be employed.

Moreover, to ensure the substitution of $Si_3N_4$ precipitate by MN precipitate in the steel, the soaking temperature is preferably 950° C. or more. The soaking temperature is desirably 1000° C. or more and 1100° C. or less. If the soaking temperature is less than 1000° C., there is a possibility that the precipitate substitution is incomplete and the magnetic property degrades. If the soaking temperature is more than 1100° C., there is a possibility that secondary recrystallization is unstable. The soaking time is preferably 3 sec or more, for the precipitate substitution. The soaking time is preferably 120 sec or less, to prevent excessive coarsening of the precipitate.

[Cold Rolling]

After the hot band annealing, cold rolling is performed once, or twice or more with intermediate annealing performed therebetween according to need. The intermediate annealing temperature is preferably 900° C. or more and 1200° C. or less. If the temperature is less than 900° C., the recrystallized grains are fine, and Goss nuclei in the primary recrystallized texture decrease, as a result of which the magnetic property degrades. If the temperature is more than 1200° C., the grain size coarsens excessively, which is very disadvantageous in realizing primary recrystallized texture of uniformly-sized grains. In the final cold rolling, it is effective to increase the cold rolling temperature to 100° C. to 300° C. and also perform aging treatment in a range of 100° C. to 300° C. once or more at an intermediate point in the cold rolling, in terms of changing the recrystallized texture and improving the magnetic property.

[Primary Recrystallization Annealing]

After this, primary recrystallization annealing is performed. The primary recrystallization annealing may also serve as decarburization. An effective annealing temperature in terms of decarburization performance is 800° C. or more and 900° C. or less. The atmosphere is desirably a wet atmosphere, in terms of decarburization. In the case where the chemical composition contains only C: 0.005% or less which does not require decarburization, on the other hand, conditions other than those mentioned above may be used. The average heating rate to the holding temperature is desirably 50° C./s or more and 400° C./s or less, to achieve favorable final magnetic property.

[Annealing Separator]

An annealing separator is applied to the steel sheet after the primary recrystallization annealing. The use of an annealing separator mainly composed of MgO enables, when secondary recrystallization annealing is performed subsequently, secondary recrystallized texture to develop and a forsterite film to form. In the case where a forsterite film is not needed with importance being put on blanking workability, MgO for forming a forsterite film is not used, and instead silica, alumina, or the like is used. The application of such an annealing separator is effectively performed by, for example, electrostatic coating that does not introduce moisture. A heat-resistant inorganic material sheet (silica, alumina, or mica) may be used.

[Secondary Recrystallization Annealing]

After this, secondary recrystallization annealing is performed. To develop secondary recrystallization, the secondary recrystallization annealing is desirably performed at 800° C. or more. To complete the secondary recrystallization, the steel sheet is desirably annealed at a temperature of 800° C. or more for 20 hr or more. Further, to form a forsterite film, it is preferable to heat the steel sheet to about 1200° C.

[Flattening Annealing]

It is effective to perform, after the secondary recrystallization annealing, water washing, brushing, pickling, or the like to remove the annealing separator adhering to the steel sheet. By further performing flattening annealing for shape adjustment, iron loss can be reduced effectively. The annealing temperature in the flattening annealing is preferably 750° C. to 900° C., and the annealing time is preferably 3 sec or more and 120 sec or less.

[Insulating Coating]

In the case of using the steel sheet in a stacked state, it is effective to form an insulation coating on the steel sheet surface before or after the flattening annealing, in order to improve iron loss. In this case, a coating capable of imparting tension to the steel sheet is preferable for iron loss reduction. In the insulating coating, a coating method of applying a tension coating through a binder or a coating method of depositing an inorganic substance onto the steel sheet surface layer by physical vapor deposition or chemical vapor deposition is preferably used as it provides excellent coating adhesion and has a considerable iron loss reduction effect.

[Magnetic Domain Refining Treatment]

In addition, magnetic domain refining treatment is desirably performed to further reduce iron loss. As the treatment method, a typical method such as introducing strain to the crystal lattice of iron in the steel sheet after final annealing by an electron beam, a laser, or the like is desirable. A method of grooving, instead of the steel sheet after final annealing, an intermediate product such as the cold rolled sheet that has reached the final sheet thickness beforehand may also be used.

The other production conditions may comply with typical grain-oriented electrical steel sheet production methods.

EXAMPLES

Example 1

Each steel slab having a composition containing C: 0.023%, Si: 3.55%, Mn: 0.18%, sol.Al: 42 ppm, N: 42 ppm, S: 11 ppm, Sb: 0.075%, and a balance being Fe and inevitable impurities was produced by continuous casting, subjected to slab heating at 1170° C., and then hot rolled to a thickness of 2.4 mm. The hot rolled sheet was then subjected to hot band annealing at 900° C. or 975° C. for 20 sec, in an atmosphere of 90% $N_2$+10% $CO_2$ with a dew point of 40° C. In the heating process in the hot band annealing, the average heating rate from ordinary temperature to 400° C. and the time to reach 900° C. from 400° C. were varied as shown in Table 1.

Pickling was performed after the hot band annealing to remove scale from the surface, and then the hot rolled sheet was cold rolled to a sheet thickness of 1.6 mm. The cold rolled sheet was then subjected to intermediate annealing at 1100° C. for 110 sec in an atmosphere of 70% $N_2$+30% $H_2$ with a dew point of 40° C., and thereafter cold rolled to a thickness of 0.20 mm. After this, primary recrystallization annealing also serving as decarburization at 850° C. for 60 sec in a wet atmosphere of 50% $H_2$-50% $N_2$ with a dew point of 50° C. was performed. Further, an annealing separator mainly composed of MgO was applied, and secondary recrystallization annealing involving holding the steel sheet at 900° C. for 40 hr in a $N_2$ atmosphere and then holding the steel sheet at 1220° C. for 5 hr in a hydrogen atmosphere was performed. The magnetic flux density $B_8$ (magnetic flux density when excited with 800 A/m) of the obtained sample was measured by the method prescribed in JIS C2550. The obtained magnetic flux density $B_8$ is listed in Table 1. The results in Table 1 demonstrate that favorable magnetic flux density $B_8$ was achieved by setting the average heating rate from ordinary temperature to 400° C. to 50° C./s or more and the time to reach 900° C. from 400° C. to 100 sec or less. The results in Table 1 also demonstrate that favorable magnetic flux density $B_8$ was further achieved by setting the soaking temperature in the hot band annealing to 950° C. or more.

TABLE 1

| No. | Average heating rate from ordinary temperature to 400° C. (° C./s) | Time to reach 900° C. from 400° C. (s) | Magnetic flux density $B_8$ (T) | Soaking temperature (° C.) | Soaking time (s) | Remarks |
|---|---|---|---|---|---|---|
| 1 | 10 | 40 | 1.925 | 975 | 20 | Comparative Example |
| 2 | 10 | 90 | 1.922 | | | Comparative Example |
| 3 | 10 | 140 | 1.915 | | | Comparative Example |
| 4 | 30 | 40 | 1.927 | | | Comparative Example |
| 5 | 30 | 90 | 1.920 | | | Comparative Example |
| 6 | 30 | 140 | 1.910 | | | Comparative Example |
| 7 | 45 | 100 | 1.929 | | | Comparative Example |
| 8 | 50 | 100 | 1.941 | | | Example |
| 9 | 50 | 110 | 1.931 | | | Comparative Example |
| 10 | 60 | 40 | 1.943 | | | Example |
| 11 | 60 | 90 | 1.943 | | | Example |
| 12 | 60 | 140 | 1.919 | | | Comparative Example |
| 13 | 90 | 40 | 1.944 | | | Example |
| 14 | 90 | 90 | 1.940 | | | Example |
| 15 | 90 | 140 | 1.927 | | | Comparative Example |
| 16 | 150 | 40 | 1.948 | | | Example |
| 17 | 150 | 90 | 1.945 | | | Example |
| 18 | 150 | 140 | 1.930 | | | Comparative Example |
| 19 | 60 | 90 | 1.940 | 900 | | Example |
| 20 | 90 | 40 | 1.941 | | | Example |

Example 2

Each steel slab having a composition containing the components listed in Table 2 and a balance being Fe and inevitable impurities was produced by continuous casting, subjected to slab heating at 1200° C., and then hot rolled to a thickness of 2.5 mm. The hot rolled sheet was then subjected to hot band annealing at 1060° C. for 45 sec in an atmosphere of 80% $N_2$+20% $CO_2$ with a dew point of 30° C. In the heating process in the hot band annealing, the average heating rate from ordinary temperature to 400° C. was set to 100° C./s, and the time to reach 900° C. from 400° C. was set to 45 sec.

Pickling was performed after the hot band annealing to remove scale from the surface, and then the hot rolled sheet was warm rolled at 150° C. to a thickness of 0.27 mm. After this, primary recrystallization annealing also serving as decarburization at 850° C. for 180 sec in a wet atmosphere of 60% $H_2$-40% $N_2$ with a dew point of 50° C. was performed. Further, an annealing separator mainly composed of MgO was applied, and secondary recrystallization annealing involving holding the steel sheet at 1175° C. for 15 hr in a hydrogen atmosphere was performed. The magnetic flux density $B_8$ of the obtained sample was measured by the method prescribed in JIS C2550. The obtained magnetic flux density $B_8$ is listed in Table 2. The results in Table 2 demonstrate that favorable magnetic flux density $B_8$ was achieved by the steel slab having a chemical composition containing C: 0.002% or more and 0.100% or less, Si: 2.00% or more and 6.50% or less, Mn: 0.02% or more and 1.00% or less, S: 50 ppm or less, N: 50 ppm or less, Se: 50 ppm or less, and acid-soluble Al: less than 100 ppm. The results in Table 2 also demonstrate that favorable magnetic flux density $B_8$ was further achieved by adding predetermined optional additional components.

TABLE 2

| No. | C (%) | Si (%) | Mn (%) | N (ppm) | S (ppm) | Se (ppm) | sol. Al (ppm) | Others (%) | Magnetic flux density $B_8$ (T) | Remarks |
|---|---|---|---|---|---|---|---|---|---|---|
| 1 | 0.033 | 3.24 | 0.08 | 14 | 8 | — | 85 | — | 1.941 | Example |
| 2 | 0.004 | 2.12 | 0.91 | 48 | 41 | 40 | 35 | — | 1.942 | Example |
| 3 | 0.002 | 3.33 | 0.11 | 23 | 25 | — | 50 | — | 1.942 | Example |
| 4 | 0.100 | 3.35 | 0.15 | 22 | 25 | — | 55 | — | 1.943 | Example |
| 5 | 0.054 | 6.50 | 0.11 | 18 | 23 | — | 52 | — | 1.940 | Example |
| 6 | 0.048 | 3.09 | 1.00 | 20 | 25 | — | 60 | — | 1.940 | Example |
| 7 | 0.093 | 4.32 | 0.03 | 7 | 22 | — | 51 | — | 1.940 | Example |
| 8 | 0.060 | 5.55 | 0.21 | 33 | 30 | 20 | 66 | — | 1.943 | Example |
| 9 | 0.001 | 3.33 | 0.07 | 24 | 17 | — | 63 | — | 1.836 | Comparative Example |
| 10 | 0.058 | 3.26 | 0.01 | 29 | 8 | — | 72 | — | 1.525 | Comparative Example |
| 11 | 0.055 | 3.25 | 0.13 | 51 | 11 | — | 65 | — | 1.928 | Comparative Example |
| 12 | 0.053 | 2.97 | 0.10 | 31 | 51 | — | 70 | — | 1.923 | Comparative Example |
| 13 | 0.055 | 3.11 | 0.14 | 30 | 13 | 51 | 55 | — | 1.910 | Comparative Example |
| 14 | 0.052 | 3.19 | 0.15 | 20 | 15 | — | 102 | — | 1.888 | Comparative Example |
| 15 | 0.150 | 2.78 | 0.34 | 33 | 21 | — | 72 | — | 1.825 | Comparative Example |
| 16 | 0.046 | 1.77 | 0.15 | 20 | 20 | — | 80 | — | 1.906 | Comparative Example |
| 17 | 0.036 | 6.69 | 0.21 | 44 | 18 | — | 36 | — | 1.554 | Comparative Example |
| 18 | 0.050 | 3.27 | 1.12 | 32 | 8 | 10 | 90 | — | 1.866 | Comparative Example |
| 19 | 0.071 | 2.99 | 0.09 | 82 | 14 | — | 42 | — | 1.839 | Comparative Example |
| 20 | 0.009 | 3.33 | 0.07 | 40 | 73 | — | 68 | — | 1.836 | Comparative Example |
| 21 | 0.024 | 3.67 | 0.17 | 15 | 41 | 100 | 36 | — | 1.787 | Comparative Example |
| 22 | 0.068 | 3.03 | 0.17 | 20 | 45 | — | 140 | — | 1.905 | Comparative Example |
| 23 | 0.066 | 3.34 | 0.15 | 21 | 18 | — | 45 | P: 0.22, Cr: 0.07, Cu: 0.12 | 1.953 | Example |
| 24 | 0.067 | 3.35 | 0.12 | 27 | 15 | — | 22 | Mo: 0.007, Ni: 0.18, Sn: 0.05 | 1.945 | Example |
| 25 | 0.063 | 3.11 | 0.23 | 45 | 25 | 40 | 88 | Bi: 0.018, Nb: 0.0025, Sb: 0.03 | 1.945 | Example |

TABLE 2-continued

| No. | C (%) | Si (%) | Mn (%) | N (ppm) | S (ppm) | Se (ppm) | sol. Al (ppm) | Others (%) | Magnetic flux density $B_8$ (T) | Remarks |
|---|---|---|---|---|---|---|---|---|---|---|
| 26 | 0.045 | 3.58 | 0.06 | 15 | 47 | — | 35 | Mo: 0.13, Sb: 0.31, Sn: 0.25 | 1.955 | Example |
| 27 | 0.024 | 2.24 | 0.49 | 6 | 11 | — | 60 | Ti: 0.06, Nb: 0.012, P: 0.03 | 1.948 | Example |

The invention claimed is:

1. A method of producing a grain-oriented electrical steel sheet, comprising:
    heating a steel slab at 1300° C. or less, the steel slab having a chemical composition containing
        C: 0.002 mass % or more and 0.100 mass % or less,
        Si: 2.00 mass % or more and 6.50 mass % or less,
        Mn: 0.02 mass % or more and 1.00 mass % or less,
        S: 50 mass ppm or less,
        N: 50 mass ppm or less,
        Se: 50 mass ppm or less,
        acid-soluble Al: less than 100 mass ppm, and
        a balance being Fe and inevitable impurities;
    subjecting the steel slab to hot rolling, to obtain a hot rolled steel sheet;
    subjecting the hot rolled steel sheet to hot band annealing;
    subjecting the hot rolled steel sheet after the hot band annealing to cold rolling once, or twice or more with intermediate annealing performed therebetween, to obtain a cold rolled steel sheet having a final sheet thickness;
    subjecting the cold rolled steel sheet to primary recrystallization annealing; and
    applying an annealing separator to a surface of the cold rolled steel sheet after the primary recrystallization annealing, and thereafter subjecting the cold rolled steel sheet to secondary recrystallization annealing,
    wherein in the hot band annealing, an average heating rate from an ambient temperature to 400° C. is set to 50° C./s or more, and a time to reach 900° C. from 400° C. is set to 100 sec or less.

2. The method of producing a grain-oriented electrical steel sheet according to claim 1,
    wherein the chemical composition further contains one or more selected from
        Sb: 0.01 mass % or more and 0.50 mass % or less,
        Sn: 0.01 mass % or more and 0.50 mass % or less,
        Ni: 0.005 mass % or more and 1.5 mass % or less,
        Cu: 0.005 mass % or more and 1.5 mass % or less,
        Cr: 0.005 mass % or more and 0.1 mass % or less,
        P: 0.005 mass % or more and 0.5 mass % or less,
        Mo: 0.005 mass % or more and 0.5 mass % or less,
        Ti: 0.0005 mass % or more and 0.1 mass % or less,
        Nb: 0.0005 mass % or more and 0.1 mass % or less, and
        Bi: 0.005 mass % or more and 0.1 mass % or less.

3. The method of producing a grain-oriented electrical steel sheet according to claim 1,
    wherein the average heating rate from an ambient temperature to 400° C. is set to 100° C./s or more.

4. The method of producing a grain-oriented electrical steel sheet according to claim 1, further comprising, after the hot band annealing and before the cold rolling, performing pickling to remove scale from the surface of the hot rolled steel sheet.

* * * * *